(12) United States Patent
Shaw

(10) Patent No.: US 9,753,362 B2
(45) Date of Patent: Sep. 5, 2017

(54) MOUNTED LENTICULAR GRATING WITH PARALLAX GHOSTING MITIGATION FOR MANY-FRAME ANIMATION

(71) Applicant: Laurence Jay Shaw, San Francisco, CA (US)

(72) Inventor: Laurence Jay Shaw, San Francisco, CA (US)

( * ) Notice: Subject to any disclaimer, the term of this patent is extended or adjusted under 35 U.S.C. 154(b) by 0 days.

(21) Appl. No.: 15/092,539

(22) Filed: Apr. 6, 2016

(65) Prior Publication Data

US 2016/0291450 A1    Oct. 6, 2016

Related U.S. Application Data

(60) Provisional application No. 62/143,754, filed on Apr. 6, 2015.

(51) Int. Cl.
*G03B 25/02* (2006.01)
*G02B 3/00* (2006.01)
*G09F 19/12* (2006.01)

(52) U.S. Cl.
CPC ............. *G03B 25/02* (2013.01); *G02B 3/005* (2013.01); *G09F 19/12* (2013.01)

(58) Field of Classification Search
CPC ..................................................... G03B 25/02
USPC .......................................................... 40/454
See application file for complete search history.

(56) References Cited

U.S. PATENT DOCUMENTS

| 4,959,641 | A | * | 9/1990 | Bass | .................. | G02B 27/2214 345/6 |
| 5,852,512 | A | | 12/1998 | Chikazawa | | |
| 6,251,566 | B1 | | 6/2001 | Brosh et al. | | |
| 6,373,637 | B1 | | 4/2002 | Gulick, Jr. et al. | | |
| 6,405,464 | B1 | * | 6/2002 | Gulick, Jr. | ......... | G02B 27/2214 348/E13.022 |
| 6,483,644 | B1 | | 11/2002 | Gottfried et al. | | |
| 6,748,684 | B1 | | 6/2004 | Bar-Yona | | |
| 7,950,805 | B2 | * | 5/2011 | Spodek | .................. | G02B 3/005 352/100 |

(Continued)

OTHER PUBLICATIONS

Hee-Jin Im et al, "Auto-Stereoscopic 60 View 3D using Slanted Lenticular Lens Array," Journal of Information Display, 2007, pp. 23-26, vol. 8, No. 4., Taylor & Francis, UK.

*Primary Examiner* — Joanne Silbermann
(74) *Attorney, Agent, or Firm* — Integral Partner Associates

(57) ABSTRACT

Parallax ghosting is mitigated in a mounted lenticular grating with for many-frame animation by having lenticules at an offset angle $\alpha$ relative to the viewing vertical and incorporating ghosting in the base images. Where $\Omega$ is an angular range orthogonal to the longitudinal axes of the lenticules over which m picture slices in the base graphic are viewable, V is the distance between the viewer's eyes, and L is the distance of the viewer from the lenticular grating, the number N of picture slices viewed due to the parallax effect given by $N = 2(m/\Omega) \arctan(V |\cos \alpha| 2 L)$.

The above variables are chosen such that the number N of viewed picture slices is not too large. Ghosting of foreground images from neighboring frames is added to mitigate parallax-induced washing-out of colors. To create a three-dimensional effect, ghosted images are shifted in position by an amount related to their intended distance out-of-plane.

19 Claims, 9 Drawing Sheets

(56) References Cited

U.S. PATENT DOCUMENTS

| | | | |
|---|---|---|---|
| 2006/0003295 A1 | 1/2006 | Hersch et al. | |
| 2009/0056182 A1* | 3/2009 | Hung | G03B 25/02 |
| | | | 40/454 |
| 2009/0109490 A1 | 4/2009 | Lau et al. | |
| 2013/0265640 A1* | 10/2013 | Saito | G02B 27/2214 |
| | | | 359/463 |
| 2013/0314780 A1* | 11/2013 | Marttila | G02B 27/2214 |
| | | | 359/463 |
| 2014/0002897 A1* | 1/2014 | Krijn | H04N 13/0404 |
| | | | 359/463 |
| 2014/0285884 A1 | 9/2014 | Raymond et al. | |

* cited by examiner

MOUNTED LENTICULAR GRATING WITH PARALLAX GHOSTING MITIGATION FOR MANY-FRAME ANIMATION

RELATED APPLICATIONS

The present application is based on and claims the priority of provisional patent application Ser. No. 62/143,754 filed 6 Apr. 2015 by Laurence J. Shaw for "Lenticular grating animation with parallax ghosting mitigation."

FIELD OF THE INVENTION

The present invention relates to lenticular gratings, particularly mounted lenticular gratings and particularly lenticular gratings for many-frame animations.

BACKGROUND OF THE INVENTION

Generally, lenticular gratings are either (i) made for hand-held use, i.e., the grating is held, and the orientation of the grating relative to the eyes is controlled by the hand, or (ii) made for mounted use (i.e., the lenticular grating is mounted to a more massive object, the more massive object typically being relatively immovable and therefore the lenticular grating is fixed in position and orientation) and differing images are viewed by the viewer upon moving relative to the grating.

Mounted lenticular gratings are, for instance, used on display boxes or signage where a viewer is meant to see a sequence of images while walking past it. According to the prior art, in such cases the lenticules are oriented along the vertical of the image, since if the lenticules were oriented horizontally a person walking by would not see multiple images since the eyes would stay at essentially the same angle relative to the surfaces of the lenticules as the viewer walks by.

It is therefore an object of the present invention to provide a lenticular grating, particularly for a walk-by, mounted display, which provides an animation, and particularly an animation with a high number of base images.

Furthermore, it is an object of the present invention to provide a lenticular grating, particularly for a walk-by, mounted display, which provides an animation with a high number of base images where parallax ghosting effects are reduced or mitigated.

It is another object of the present invention to add ghosting to the base pictures of a lenticular grating, particularly for a walk-by, mounted display, which provides an animation which mitigates or reduces undesirable parallax ghosting effects.

It is another object of the present invention to provide a lenticular grating, particularly for a walk-by, mounted display, for an animation having good color contrasts, particularly for dynamic foreground objects, and particularly where there are a high number of base pictures.

It is another object of the present invention to provide a lenticular display, particularly for a walk-by, mounted display, which provides an animation with a three-dimensional appearance.

Additional objects and advantages of the invention will be set forth in the description which follows, and will be obvious from the description or may be learned by practice of the invention. The objects and advantages of the invention may be realized and obtained by means of the instrumentalities and combinations particularly pointed out in the claims.

SUMMARY OF THE INVENTION

A lenticular grating which produces an animated image, the grating having a base graphic on a base plane which is an interleavement of an integer number, which is greater than or equal to four, of compressed base pictures. Each of the compressed base pictures is a spatial compression by a compression factor of an uncompressed base picture along a compression axis, where the compression factor is greater than or equal to the integer number of compressed base pictures. The lens is a linear array of lenticules where adjacent lenticules are separated by a separation distance and each lenticule magnifies by a magnification factor equal to the compression factor. The longitudinal axes of the lenticules are parallel and offset from a viewing vertical by a non-zero offset angle which is greater than $\pi/18$ radians. The interleavement of the compressed base pictures is formed by slicing, parallel to the longitudinal axes of the lenticules, the compressed base pictures into compressed base picture slices having widths equal to the separation distance divided by the compression factor, and interleaving the compressed base picture slices.

BRIEF DESCRIPTION OF THE DRAWINGS

The accompanying figures, which are incorporated in and form a part of this specification, illustrate embodiments of the invention and, together with the description given above and the detailed description of the preferred embodiments given below, serve to explain the principles of the invention.

DETAILED DESCRIPTION OF THE PREFERRED EMBODIMENTS

Figure 1A:
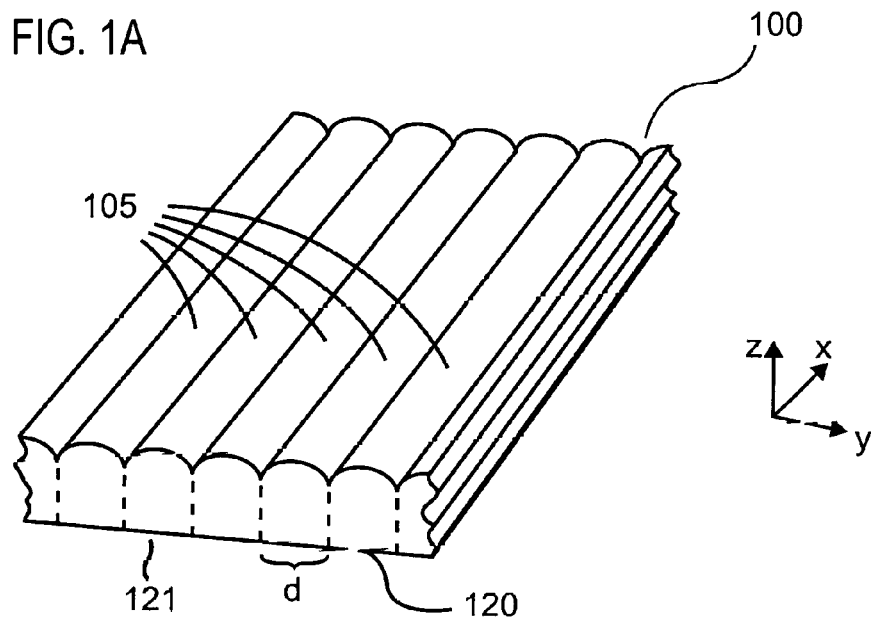
FIG. 1A is a close-up, perspective view of a lenticular grating.
Figure 1B:
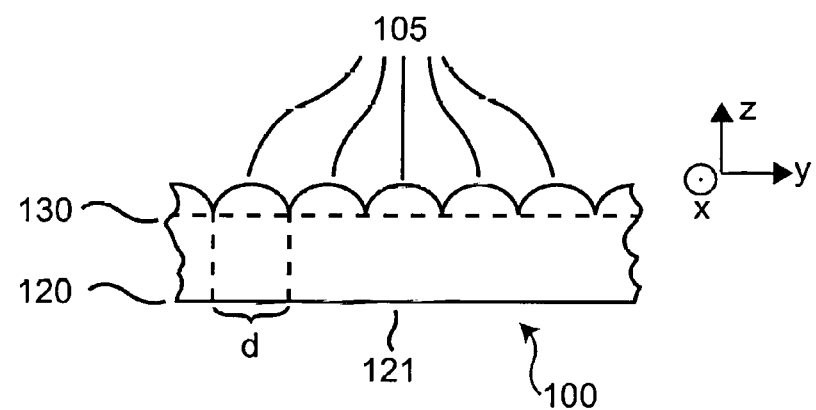
FIG. 1B is a cross-sectional view of the lenticular grating of FIG. 1A.

As shown in the close-up, perspective view of FIG. 1A and the cross-sectional view of FIG. 1B, a lenticular lens or lenticular grating (100) is a linear array of abutting magnifying lenses, or lenticules (105), mounted on an interleaved base graphic (121) on a graphic plane (120). The surface of each lenticule (105) is typically a half cylinder cut along the longitudinal axis, i.e., a cross-sectional profile of the grating (100) is a series of connected half circles as is shown in FIG. 1B. In FIGS. 1A and 1B the longitudinal axes of the cylinders are parallel to the x axis, they axis is in the plane of the grating (100) and transverse to the longitudinal axes of the lenticules (105), and the z axis is normal to the plane (130) of the lenticules (105) and the graphic plane (120). If the lenticular grating is to be mounted to an object, such as a wall or a display box, a means for mounting (not shown), such as double-sided tape, hooks, tacks, magnetic mounting means, etc. will be utilized.

Figure 2:
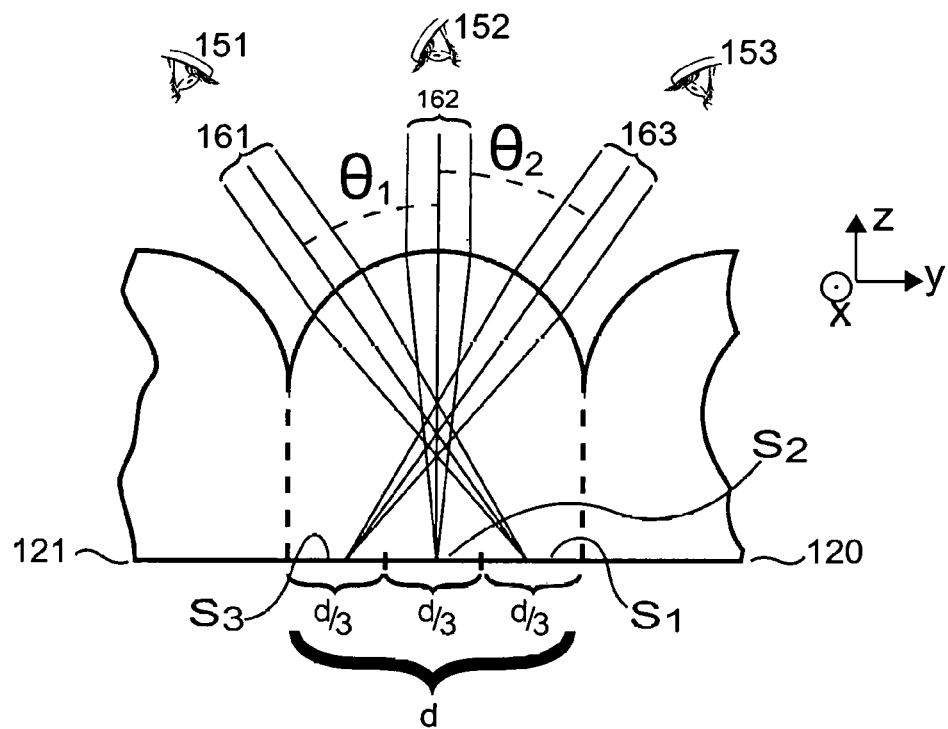
FIG. 2 traces how lines of sight from different viewing angles fall upon different compressed picture slices in the graphic plane.

FIG. 2 shows an exemplary lenticule (105) with a three-slice base graphic (121) on the base plane (120). The focal length f of each lenticule (105) is roughly equal to the distance from the surface of the lenticule (105) to the graphic plane (120) of the base graphic (121). Rays of light (162) incident on the lenticule (105) from directly above converge on the central slice $S_2$ of the base graphic (121), rays of light (161) incident on the lenticule (105) from the left converge on the rightmost slice $S_1$ of the base graphic (121), and rays of light (163) incident on the lenticule (105) from the right converge on the leftmost slice $S_3$ of the base graphic (121). Therefore, when viewed from above (152), the central slice $S_2$ (or central slices $S_2$ of each lenticule (105) if the entirety of the grating (100) is considered) of the base graphic (121) is visible; when viewed from the right (153), the leftmost slice $S_3$ (or leftmost slices $S_3$ of each lenticule (105) if the entirety of the grating (100) is considered) of the base graphic (121) is visible; and when viewed from the left (151), the rightmost slice $S_1$ (or leftmost slices $S_1$ of each lenticule (105) if the entirety of the grating (100) is considered) of the base graphic (121) is visible. The repeat distance of the interleaved base graphic (121) is the separation distance (i.e., width) d of the lenticules (105), and the slices $S_1$, $S_2$ and $S_3$ each have a width of d/3.

Figure 3A:
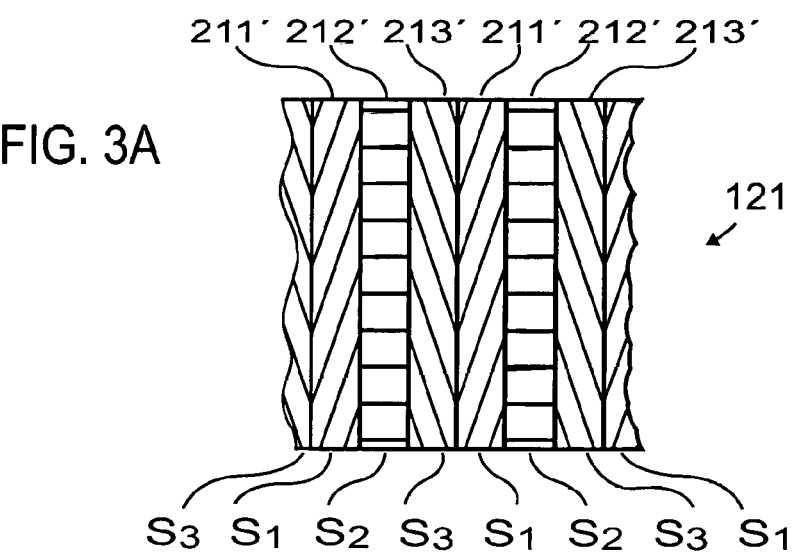
FIG. 3A shows a base image produced by an interleavement of the exemplary base pictures of FIGS. 3B, 3C and 3D.
Figure 3B:
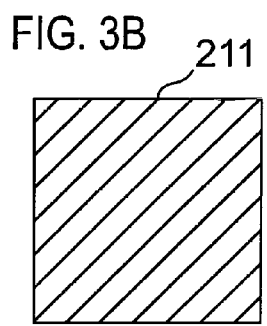
FIG. 3B shows a first exemplary picture of lines slanted upwards to the right.
Figure 3C:
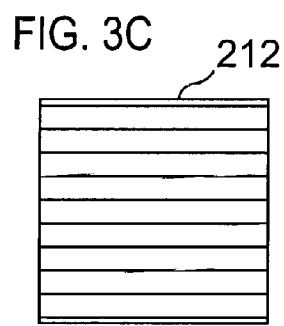
FIG. 3C shows a second exemplary picture of horizontal lines.
Figure 3D:
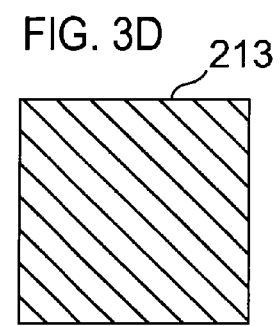
FIG. 3D shows a third exemplary picture of lines slanted downwards to the right.

An exemplary base graphic (121) shown in FIG. 3A consists of the compression and interleavement of the three simple base pictures (211), (212) and (213) shown in FIGS. 3B, 3C and 3D, respectively. The first base picture (211) is a series of equally spaced parallel lines which slant upwards to the right, the second base picture (212) is a series of equally spaced parallel lines which are horizontal, and the third base picture (213) is a series of equally spaced parallel lines which slant downwards to the right. As can be seen in FIG. 3A, the interleaved base graphic (121) consists of vertical slices of horizontally compressed versions (211'), (212') and (213') of the three base pictures (211), (212) and (213). Because there are three base pictures (211), (212) and (213), the compression factor is three and the slope of the lines in the horizontally-compressed slices (211'), (212') and (213') is three times greater than in the base pictures (211), (212) and (213). (It should be noted that although the horizontally compressed picture slices (211'), (212') and (213') associated with each lenticule (105) are depicted in the base graphic (121) of FIG. 3A as abutting, there may be filler spaces between the horizontally compressed picture slices (211'), (212') and (213') associated with each lenticule (105).)

As shown in FIG. 2, when viewed from the left (151), the slices $S_1$ with lines slanting upwards to the right from the base picture (211) of FIG. 3B are seen; when viewed from above (152), slices $S_2$ with the horizontal lines from the base picture (212) of FIG. 3C are seen; and when viewed from the right (153), slices $S_3$ with lines slanting downwards to the right from the base picture (213) of FIG. 3D are seen. An animation produced by sequential appearance of the images is therefore seen by moving by the lenticular grating (100) from right to left (or vice versa). In particular, if the view moves from the leftmost viewing position (151) to the center viewing position (152) and then to the rightmost viewing position (153), the base pictures (211), (212), and (213) of FIGS. 3B, 3C, and 3D, respectively, are seen in sequence, providing an animation where the lines rotate clockwise. More generally, with a base graphic (121) which is an interleavement of compressed versions of multiple pictures which are, for instance, equally time-spaced stills from a video, viewing of the lenticular grating (100) produces an animation resembling the video.

It should be noted that in the discussion above it is assumed that both eyes of the viewer are at the same angle of viewing relative to the z axis. This would indeed be the case when the viewer is facing so that the separation vector between the viewers eyes is along the x axis. In such a case, the lenticules (105) would have their longitudinal axes oriented along the viewing horizontal. However, this is generally not the case with mounted lenticular gratings where the lenticular grating is meant to display a sequence of images as the viewer walks by. In such cases the lenticules (105) are traditionally oriented vertically, i.e., the separation vector between the viewer's eyes has a non-zero y component. (It should be noted that what is herein termed the "viewing vertical" of the image need not be true vertical. In general, the viewing vertical is along the vector cross product of the normal of the plane of the grating and the separation vector between the eyes of the viewer. For instance, the lenticular grating may be mounted on the ground and the viewing vertical would actually be along a true horizontal.)

Figure 4:
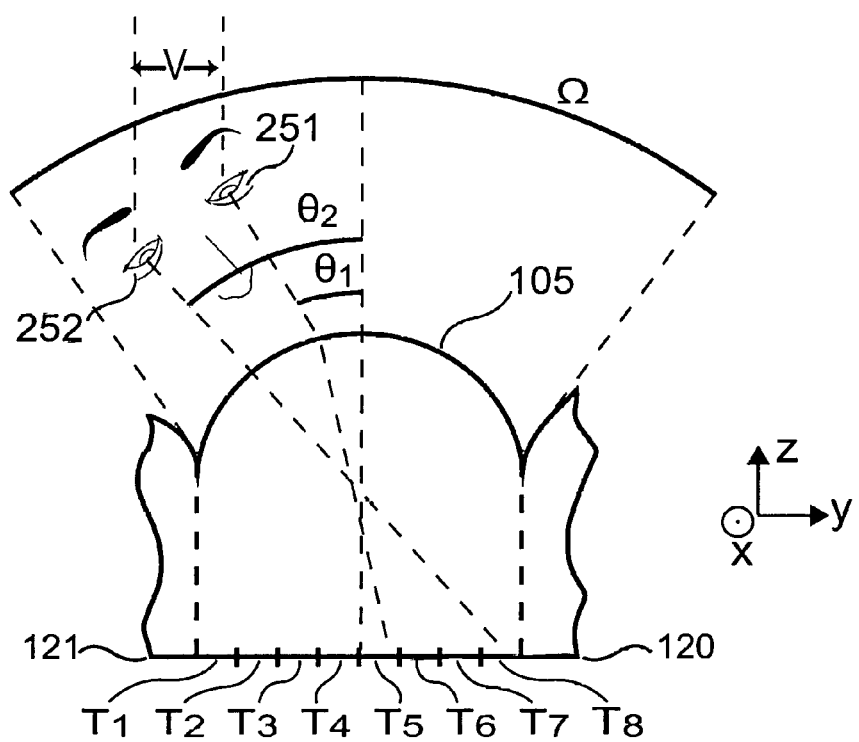
FIG. 4 illustrates how when the eyes have a separation vector with a non-zero y component there is parallax ghosting where each eye views a different picture slice.

FIG. 4 shows a (grossly not-to-scale) situation where the separation vector between the viewers eyes (251) and (252) has a substantial component along they axis. The lenticules (105) have their longitudinal axes oriented along the viewing vertical, i.e., along the x axis, and the angle of viewing $\theta_1$ of one eye (251) differs from the angle of viewing θ2 of the other eye (252). In FIG. 4 there are eight compressed picture slices $T_1$, $T_2$, $T_3$, $T_4$, $T_5$, $T_6$, $T_7$ and $T_8$ below the lenticule (105), and one eye (251) sees one compressed picture slice $T_5$ while the other eye (252) sees another compressed picture slice $T_8$. This parallax effect (i.e., this effect due to the separation between the eyes (251) and (252)) can produce undesirable ghosting of the viewed image where multiple base pictures are visible simultaneously. Clearly, the ghosting becomes more pronounced and problematic as the number of base picture slices per lenticule (105) increases, and this is why it is typically recommended that animations on mounted lenticular gratings (which traditionally have the longitudinal axes of the lenticules along the viewing vertical) be limited to no more than three images. However, the present invention is designed to provide animations of four or more images, preferably animations of eight or more images, and even more preferably animations of twelve or more images. More particularly, if an angular change in viewing $\Omega$ along an axis orthogonal to the longitudinal axes of the lenticules (105) results in the viewing of m picture slices, the distance along they-axis between the viewer's eyes (251) and (252) is V, and the distance of the viewer from the lenticular grating (100) is L, then the number N of picture slices viewed at any instant due to the parallax effect is $$N=2(m/\Omega)\arctan(V/2L), \quad (1.1)$$

where angles are specified in radians. When V<<L, as is typically the case, then equation (1.1) becomes $$N \approx (m/\Omega)(V/L). \quad (1.2)$$

For instance, if over the angular range $\Omega$ of 0.9 radians there are 12 picture slices viewed, the distance V between the viewer's eyes (251) and (252) is 6 cm, and the viewer is a distance L of 50 cm from the lenticular grating (100), then $N \cong 1.6$. Since in this case the number N of parallax-viewed picture slices is greater than unity, there is some ghosting between two adjacent viewed slices. However, if the number m of viewed picture slices is increased to 24 while the other variables $\Omega$, L and V remain the same as specified above, then $N \cong 3.2$ and there is parallax ghosting among roughly three adjacent picture slices.

Parallax ghosting is particularly troublesome in animations involving contrasting colors or strong light-dark contrasts (both of which will be generically referred to herein as a color contrast even if the "colors" are black and/or white) since ghosting generally "washes out" colors/contrasts. For instance, in an animation of a bright red ball traveling against a dark blue background, ghosting of the dark blue background superimposed on the bright red ball will alter the color of the ball, significantly decreasing the brightness of the red. Or in an animation of a black ball traveling against a white background, ghosting of the white background superimposed on the black ball will make the ball appear grey.

Figure 5A:
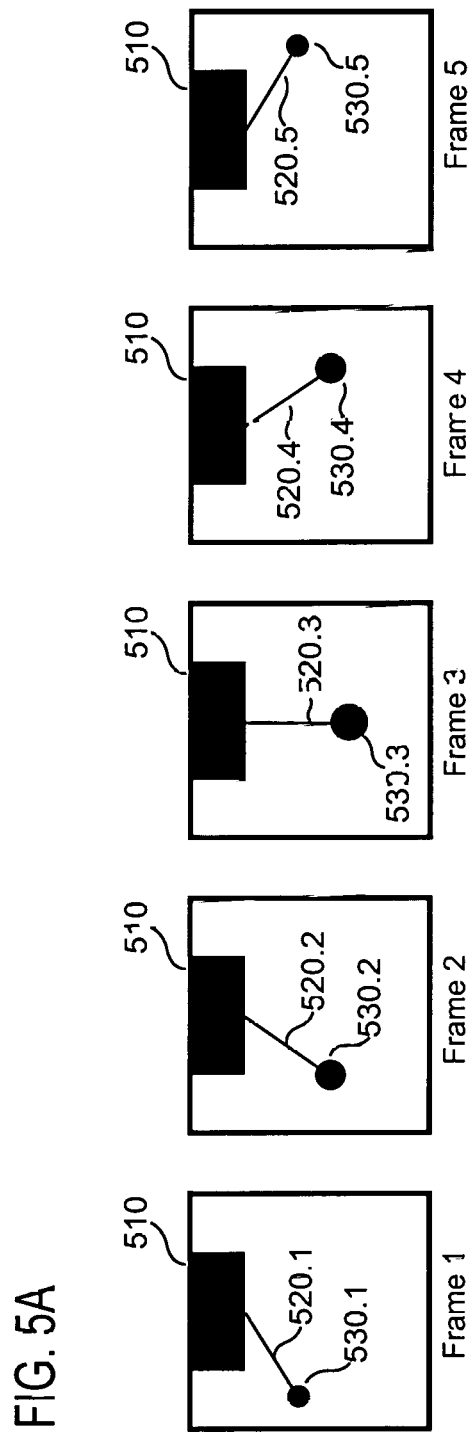
FIG. 5A shows a five-frame animation of a ball on a string swinging in a horizontal orbit.

For example, FIG. 5A shows five frames of an animation where a black ball (530) hanging from a string (520) swings in a circular orbit in the horizontal plane of the image. At its upper end the string (520) is attached to a block (510). (The ball and string will be referred to generically with reference numerals "530" and "520", respectively, and in the $n^{th}$ frame they will be referred to with reference numerals "530.$n$" and "520.$n$", respectively.) In Frame 1 the ball (530.1) is at its leftmost position in its orbit, in Frame 2 the ball (530.2) has swung forwards and rightwards, in Frame 3 the ball (530.3) is midway between its leftmost and rightmost positions and at its closest to the viewer, etc. The background of the animation of FIG. 5A is the block (510) from which the string (520) is hung and the white area behind the ball (530) and string (520), and the dynamic foreground objects are the ball (530) and string (520). It should be noted that, in general, a "dynamic foreground object" may be any object which is moving or changing in appearance, i.e., moving (translationally, rotationally, etc.), changing shape, changing color, etc. If, in the viewing of Frame 1, parallax ghosting from Frame 2 is also visible, then the ball (530.2) and string (520.2) from Frame 2 will be somewhat visible as a grey ball and string, and the ball (530.1) and string (520.1) in Frame 1 will have its darkness "washed out" (i.e., reduced) because of the mixing of the white background from Frame 2 with the black ball and string color from Frame 1.

Figure 5B:
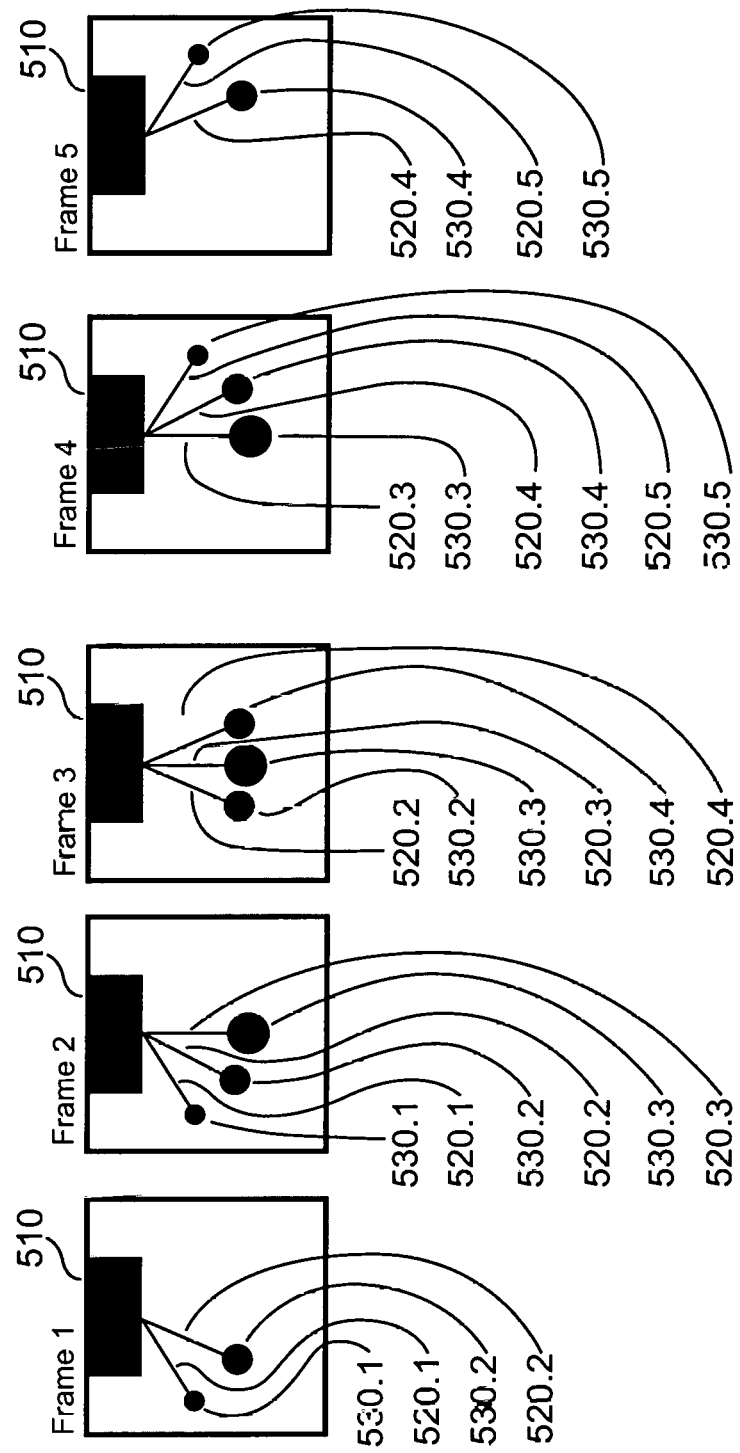
FIG. 5B shows the five-frame animation of FIG. 5A where, according to the present invention, dynamic foreground objects from adjacent frames are superimposed to mitigate parallax ghosting washing-out of colors and/or contrasts.

Another aspect of the present invention mitigates the parallax ghosting wash-out problem, not by reducing the ghosting, but rather by adding in ghosting. FIG. 5B shows an ghosting-augmented version of the animation shown in FIG. 5A. In particular, in Frame n the ball (530.$n$-1) and string (520.$n$-1) from Frame n-1 are superimposed on the background, and the ball (530.$n$+1) and string (520.$n$+1) from Frame n+1 are are superimposed on the background. (For instance, in Frame 2 the ball (530.1) and string (520.1) from Frame 1 and the ball (530.3) and string (520.3) from Frame 3 are superimposed on the background.) Therefore, if there is ghosting of the viewed frame with the next frame and/or the previous frame, the ball and string in the viewed frame will still appear black rather than grey. (In Frame 1 the ball and string from the frame prior to Frame 1, if a prior frame exists, would also be superimposed on the background.)

Equation (1.1) shows that if there are many picture slices m per lenticule (105), or if the separation distance V between the eyes (251) and (252) is not small compared to the viewer's distance L from the grating (100) (i.e., if there is a large angular separation given by $\{2*\arctan(V/2L)\}$ along the y axis between the two eyes (251) and (252) of the viewer), then there may even be ghosting from more than two slices. For instance, if m=24, $\Omega$=0.9, V=6 cm and L=50 cm, then the number N of parallax-viewed slices is roughly 3.2 and there is ghosting of the primary viewed slice with both the next slice and the previous slice. There can also be cases where there is ghosting with both the next two slices and the previous two slices, and the parallax washing-out effect will be even more pronounced. According to the present invention, the parallax-induced washing-out is mitigated by superimposing dynamic foreground objects from additional adjacent slices. For instance, if there is ghosting across five slices then according to the present invention the ball (530.$n$-2) and string (520.$n$-2) from Frame n-2, the ball (530.$n$-1) and string (520.$n$-1) from Frame n-1, the ball (530.$n$+1) and string (520.$n$+1) from Frame n+1, and the ball (530.$n$+2) and string (520.$n$+2) from Frame n+2 could be superimposed on the background of Frame n to mitigate the parallax wash-out.

The superimposing of a foreground object on the background in the base pictures may be a 100% superimposition so that the background is not at all visible in the region where the ghost version of the foreground object is located. Alternatively, the superimposition may be a mixing of the colors, hues, densities, darknesses, etc. of the ghost version of the foreground object and the background so as to provide a washed-out or ghosted appearance to the ghost-version foreground object in the base pictures. (This washing-out or ghosting in the base pictures is related to but should not be confused with the washing-out or ghosting effects that are produced—or mitigated according to the present invention—on viewing the lenticular grating (100) due to the parallax effect.)

Figure 6:
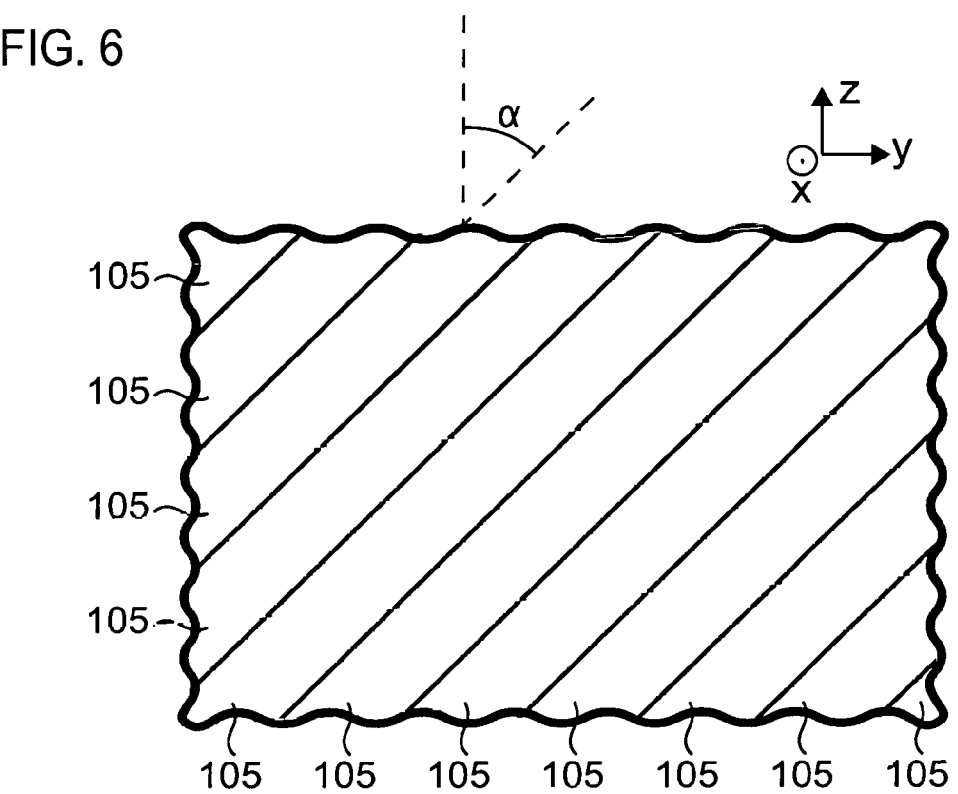
FIG. 6 is a plan view of a lenticular grating with the lenticules at an angle $\alpha$ from the viewing vertical which is along the z axis.

According to the present invention, parallax ghosting and the associated washing-out of contrasts and colors is further mitigated by orienting the longitudinal axes of the lenticules at an angle $\alpha$ offset from viewing vertical. This is depicted in FIG. 6 where the viewing vertical is along the z axis. In this case, the number N of picture slices viewed due to the parallax effect is $$N=2(m/\Omega)\arctan(V|\cos\alpha|/2L), \quad (2.1)$$

where, again, $\Omega$ is an angular range orthogonal to the longitudinal axes of the lenticules (105) over which the m picture slices in the base graphic are viewable, V is the distance between the viewer's eyes (251) and (252), L is the distance of the viewer from the lenticular grating (100), and angles are given in radians. It should be noted that the absolute value of (cos $\alpha$) is taken in equation (2.1) and all the other equations in the present specification where that term appears. Therefore, in specifications of the angle $\alpha$ it is to be understood that the angle $\alpha$ is between $-\pi/2$ and $+\pi/2$, and that there is an equivalence between $+\alpha$, $-\alpha$, $\pi-|\alpha|$, $-\pi+|\alpha|$, etc., and that when a positive value of the angle $\alpha$ is discussed the above equivalences are intended.

When $V \ll L$, as is typically the case, then equation (2.1) becomes $$N \approx (m/\Omega)(V|\cos \alpha|/L). \tag{2.2}$$

Typically, the distance V between a viewers eyes (251) and (252) is about 6 cm, and a mounted lenticular display in a store is viewed from a distance L of about 50 cm, and equation (2.2) becomes $$N = 0.12(m/\Omega)|\cos \alpha|. \tag{2.3}$$

Preferably, m, $\alpha$ and $\Omega$ are chosen such that the value of N is not too large relative to unity if the parallax effect is to be minimized. (Alternatively, if an animation with a three-dimensional effect is to be produced as described below, then preferably the quantity $\{0.12(m/\Omega)|\cos \alpha|\}$ has a value between 2 and 6, and more preferably roughly between 3 and 5.) Alternatively, according to the present invention the offset angle $\alpha$ is selected such that the absolute value of (cos $\alpha$) is less than 0.9, more preferably less than 0.8, still more preferably less than 0.7, still more preferably less than 0.6, and still more preferably less than 0.5.

However, the offset angle $\alpha$ should not be so large, i.e., so close to $\pi/2$, that the animation is not readily apparent when the viewer moves by a distance along the viewing horizontal on the order of the distance L which the viewer is from the lenticular grating (100). The characteristic number A of viewed animation frames is defined as the number of viewed picture slices seen on moving along the viewing horizontal by the distance equal to the distance L of the viewer from the grating (100), i.e., $$A = 2(m/\Omega) \arctan(0.5|\cos \alpha|). \tag{2.4}$$

Although the magnitude of the offset angle $\alpha$ should be large enough, i.e., close enough to $\pi/2$, to reduce the number N of parallax-viewed slices to be not too large, the offset angle $\alpha$ should not be so large that the characteristic number A of motion-viewed animation slices is considerably less than the number m of pictures in the animation. According to the present invention, the characteristic number A of motion-viewed animation slices should be greater, and preferably substantially greater, than unity, and should preferably be at least one-third of the number m of animation slices per lenticule (105) in the base graphic (121). As an example of a reasonable set of values: when the base graphic (121) has m=12 picture slices which are viewable over an angular range $\Omega$ of 0.9 radians, and the offset angle $\alpha$ is $(\pi/4)$ radians, then the characteristic number A of motion-viewed animation slices is 9. The characteristic ratio $$\xi = \{(2/\Omega) \arctan(0.5|\cos \alpha|)\},$$

which is equal to the ratio of the number A of frames seen when at a distance L and moving a transverse distance L divided by the total number m of frames, is preferably between ⅓ and 15/16, more preferably between ½ and ⅞, and still more preferably between ⅔ and ¾. Alternatively, according to the present invention, the longitudinal axis of the lenticules is preferably offset from the viewing vertical by an offset angle $\alpha$ between $\pi/18$ and $4\pi/9$ radians, more preferably between $\pi/9$ and $7\pi/18$ radians, more preferably between $\pi/6$ and $\pi/3$ radians, still more preferably between $7\pi/36$ and $11\pi/36$ radians, still more preferably between $2\pi/9$ and $5\pi/18$ radians, and most preferably roughly $\pi/4$ radians.

Figure 7:
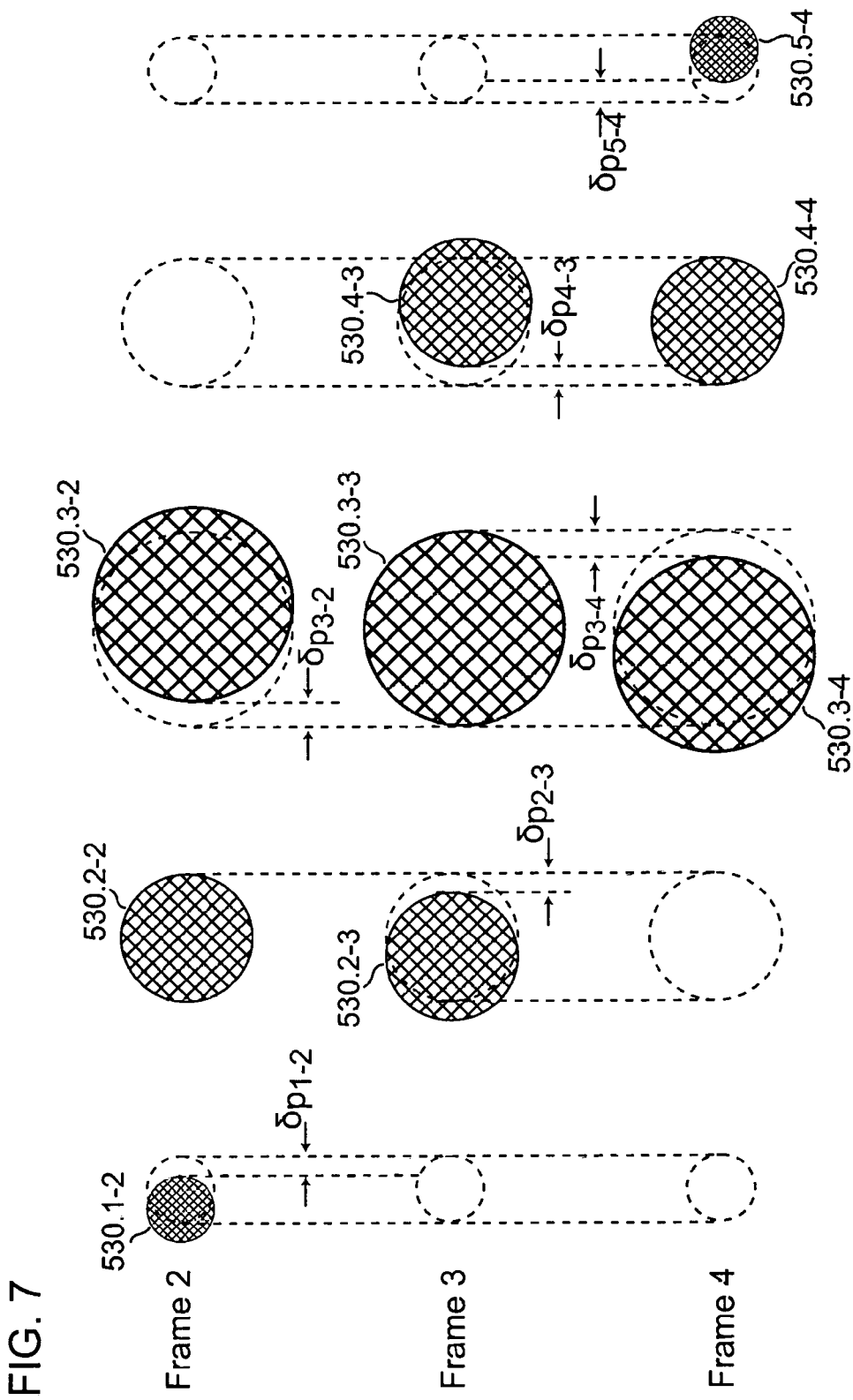
FIG. 7 shows how positions of ghost versions of the balls from the animation of FIG. 5B are shifted to provide a three-dimensional effect.

According to another embodiment of the present invention the lenticular grating provides both an animation and a three-dimensional effect. FIG. 7 shows the positions of the balls (530) in consecutive frames corresponding to Frames 2, 3 and 4 of the animation of FIG. 5B where ghost-versions of the balls (530) are shifted so as to provide a three-dimensional effect. The reference numerals used in FIG. 7 for the balls (530) and the position shifts $\delta p$ are of the form (530.x-y) and $\delta p_{x-y}$, respectively, where x indicates the position of the ball in Frame x of FIG. 5A, and y indicates the frame in FIG. 7 where the ball (530) or position shift $\delta p$ is depicted. For visual clarity the balls (530) are shown cross-hatched, rather than as solid black, so that the unshifted positions of the balls, shown by dashed lines, are also clearly visible. For instance, in Frame 2 the position of the central ball (530.2-2) is not shifted, the ghost version of the smallest (i.e., farthest from the viewer and therefore, due to perspective, smallest) ball (530.1-2) is shifted left by a distance $\delta p_{1-2}$, and the ghost version of the largest (i.e., closest to the viewer and therefore, due to perspective, largest) ball (530.3-2) is shifted right by a distance $\delta p_{3-2}$. Similarly, in Frame 3 the position of the central ball (530.3-3) is not shifted, the ghost version of the ball to the left (530.2-3) is shifted left by a distance $\delta p_{2-3}$, of the ball to the right (530.4-3) is shifted right by a distance $\delta p_{4-3}$.

Figure 8:
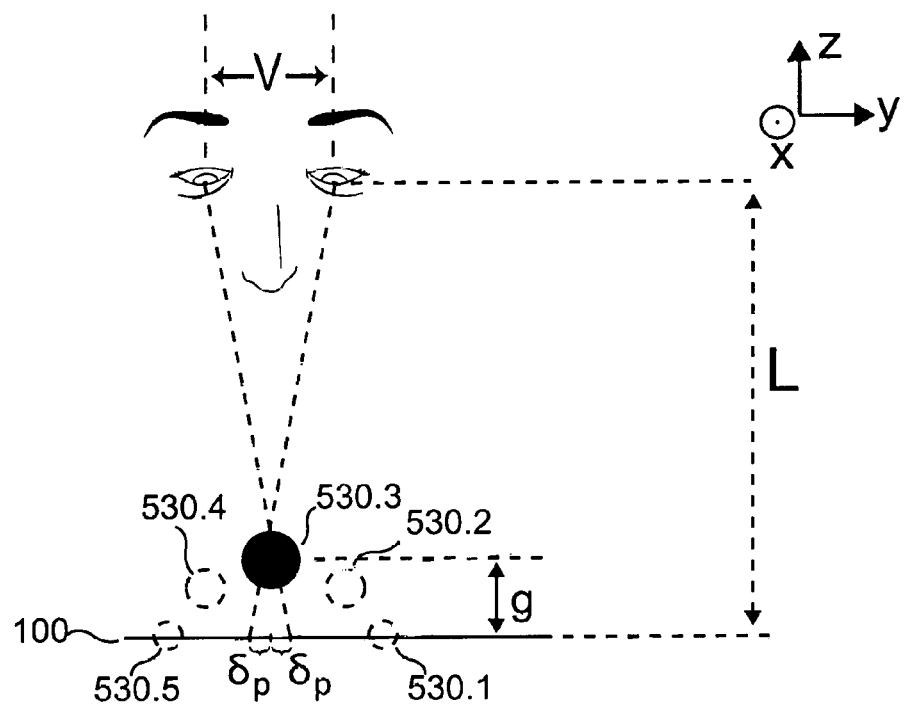
FIG. 8 shows the relationship between a ball appearing to be a distance d in front of the lenticular grating and the parallax-induced position shifts $\delta p$ required in the base graphic.

For ease of exposition consider the case where the viewer is directly in front of the grating (100) as is shown in FIG. 8, and the ball (530.3) is at the position in its circular orbit corresponding to Frame 3 where it is closest to the viewer. If the eyes are separated by a distance V along the y axis and the ball (530.3) is to be seen as being in front of the plane of the grating by an apparent distance g, then the position shifts of ball (530.3) required in Frames 2 and 4 are $$\delta p_{3-2} \delta p_{3-4} = (V g)/(2*(L-g)), \tag{3.1}$$

where the assumption has been made that the parallax effect results in one slice on each side of the central slice also being viewed. More generally, if more than three slices are viewed due to the parallax effect, for the ball (530.x) in the position corresponding to Frame x, the position shift $\delta p_{x-(x+r)}$ required in Frame (x+r) and the position shift $\delta p_{x-(x-r)}$ required in Frame (x-r) are $$\delta p_{x-(x+r)} = \delta p_{x-(x-r)} = (r V g)/(2n*(L-g)), \tag{3.2}$$

where n=[(N−1)/2], the square brackets indicating rounding to the nearest integer, N is defined as per equations (2.1) and (2.2) to be the number of picture slices viewed due to the parallax effect, and r is an integer less than or equal to n.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable those skilled in the art to best utilize the invention and various embodiments with various modifications as are suited to the particular use contemplated. Furthermore, the description of the physical principles underlying the operation and performance of the present invention are also presented for purposes of illustration and description, and are not intended to be exhaustive or limiting. It should be understood that these descriptions may include approximations, simplifications and assumptions to present the basic concepts in a mathematically tractable form, and many effects which influence the operation and performance may be neglected for ease of presentation. Subsequently, many variations are possible. For example: the surfaces of the lenticules need not be cylindrical sections and may have a variety of shapes including elliptical cross-sections; the interleaving may be referred to as interlacing; the compression factor of the base picture need not be equal to the integer number of images in the base image; the ghosted foreground objects added to the base pictures may be ghosted/washed out; viewing over the total angular viewable range of a lenticule may provide viewing of more than or less than the total number of picture slices per lenticule; the invention may be applied to graphics other than the particular graphics described herein; etc. Accordingly, it is intended that the scope of the invention should be determined not by the embodiments illustrated or the physical analyses motivating the illustrated embodiments, but rather by the appended Claims and their legal equivalents.

What is claimed is:

1. A lenticular grating producing an animation of a sequence of base pictures, comprising:
    a base graphic on a base plane which is an interleavement of an integer number m of compressed base pictures, each of said compressed base pictures being a spatial compression of an uncompressed base picture from said sequence of base pictures along a compression axis by a compression factor greater than or equal to said integer interleavement number m, said uncompressed base pictures having a viewing vertical, said integer interleavement number m being greater than or equal to 4, and
    a lens having a linear array of lenticules with parallel longitudinal axes, adjacent lenticules in said array being separated by a separation distance, each of said lenticules having a magnification factor along a magnification axis orthogonal to said longitudinal axes and parallel to said compression axis, said number m of said compressed base pictures being viewable over an angular range of $\Omega$ radians transverse said longitudinal axes, said longitudinal axes of said lenticules being offset from said viewing vertical by an offset angle $\alpha$, and said interleavement of said compressed base pictures being formed by slicing parallel to said longitudinal axes said compressed base pictures into compressed base picture slices having widths less than or equal to said separation distance divided by said compression factor and interleaving said compressed base picture slices, an absolute value of said offset angle $\alpha$ being greater than $\pi/18$ radians and less than $4\pi/9$ radians.

2. The lenticular grating of claim 1 wherein said magnification factor is equal to said compression factor.

3. The lenticular grating of claim 1 wherein said absolute value of said offset angle $\alpha$ is greater than $\pi/9$ radians and less than $7\pi/18$ radians.

4. The lenticular grating of claim 1 wherein said absolute value of said offset angle $\alpha$ is greater than $\pi/6$ radians and less than $\pi/3$ radians.

5. The lenticular grating of claim 1 wherein said absolute value of said offset angle $\alpha$ is greater than $7\pi/36$ radians and less than $11\pi/36$ radians.

6. The lenticular grating of claim 1 wherein said absolute value of said offset angle $\alpha$ is greater than $2\pi/9$ radians and less than $5\pi/18$ radians.

7. The lenticular grating of claim 1 wherein said interleavement number is greater than 8.

8. The lenticular grating of claim 1 wherein said base pictures are augmented base pictures derived from unaugmented base pictures, where said unaugmented base pictures are stills from an animation and where in each of said unaugmented base pictures there is a background and a dynamic foreground object, an $n^{th}$ in said sequence of said augmented base pictures being created from said unaugmented base pictures by superimposing said dynamic foreground object from an $(n-1)^{th}$ in said sequence of said unaugmented base pictures and superimposing said dynamic foreground object from an $(n+1)^{th}$ in said sequence of said unaugmented base pictures onto said background of said $n^{th}$ in said sequence of said augmented base pictures.

9. The lenticular grating of claim 8 wherein said $n^{th}$ in said sequence of said augmented base pictures is created by further superimposing said dynamic foreground object from an $(n-2)^{th}$ in said sequence of said unaugmented base pictures and superimposing said dynamic foreground object from an $(n+2)^{th}$ in said sequence of said unaugmented base pictures onto said background of said $n^{th}$ in said sequence of said augmented base pictures.

10. The lenticular grating of claim 8 wherein said dynamic foreground object from said $(n-1)^{th}$ in said sequence of said unaugmented base pictures is shifted left on said $n^{th}$ in said sequence of augmented base pictures by a first shift distance $\delta p_1$ related to a first distance g in front of the lenticular grating it is to appear.

11. The lenticular grating of claim 10 wherein said first shift distance $\delta p_1$ proportional is inversely related to a number N of frames visible due to a parallax effect.

12. The lenticular grating of claim 1 further including a means for mounting the lenticular grating to a more massive object.

13. The mounted lenticular grating of claim 1 wherein a quantity $$\{(2/\Omega)\arctan(0.5|\cos\alpha|)\}$$

has a value between $1/3$ and $15/16$.

14. The mounted lenticular grating of claim 1 wherein a quantity $$\{(2/\Omega)\arctan(0.5|\cos\alpha|)\}$$

has a value between $1/2$ and $7/8$.

15. The mounted lenticular grating of claim 1 wherein a quantity $$\{(2/\Omega)\arctan(0.5|\cos\alpha|)\}$$

has a value between $2/3$ and $3/4$.

16. The mounted lenticular grating of claim 1 wherein $\{0.12(m/\Omega)|\cos\alpha|\}$ is between 2 and 6.

17. A lenticular grating producing an animation of a sequence of base pictures, comprising:
    a base graphic on a base plane which is an interleavement of an integer number of compressed base pictures, each of said compressed base pictures being a spatial compression of an uncompressed base picture from said sequence of base pictures along a compression axis by a compression factor greater than or equal to said integer number, said uncompressed base pictures having a viewing vertical, said interleavement number being greater than or equal to 4, and
    a lens having a linear array of lenticules, adjacent lenticules in said array being separated by a separation distance, each of said lenticules having a longitudinal axis, said longitudinal axes of said lenticules being parallel, said magnification axis being parallel to said compression axis, and said interleavement of said compressed base pictures being formed by slicing parallel to said longitudinal axes said compressed base pictures into compressed base picture slices having widths less than or equal to said separation distance divided by said integer interleavement number and interleaving said compressed base picture slices, said base pictures are augmented base pictures derived from unaugmented base pictures, said unaugmented base pictures representing stills from an animation where in each of said unaugmented base pictures there is a background and dynamic foreground object, an $n^{th}$ in said sequence of said augmented base pictures being created from said unaugmented base pictures by a first superimposing of said dynamic foreground object from an $(n-1)^{th}$ in said sequence of said unaugmented base pictures and a second superimposing of said dynamic foreground object from an $(n+1)^{th}$ in said sequence of said unaugmented base pictures onto said background of said $n^{th}$ in said sequence of said augmented base pictures.

18. The lenticular grating of claim 17 wherein said $n^{th}$ in said sequence of said augmented base pictures is created by a third superimposing of said dynamic foreground object from an $(n-2)^{th}$ in said sequence of said unaugmented base pictures and a fourth superimposing said dynamic foreground object from an $(n+2)^{th}$ in said sequence of said unaugmented base pictures onto said background of said $n^{th}$ in said sequence of said augmented base pictures.

19. The lenticular grating of claim 17 wherein said first and second superimposings are not 100% superimpositions.

* * * * *